No. 720,664. PATENTED FEB. 17, 1903.
J. P. CAPPEAU.
ZINC SMELTING FURNACE.
APPLICATION FILED OCT. 22, 1902.
NO MODEL. 4 SHEETS—SHEET 1.

Witnesses:
H. Mallner
Joseph Merritt

Inventor
Jos. P. Cappeau
By William A. Lorenz, Atty.

No. 720,664. PATENTED FEB. 17, 1903.
J. P. CAPPEAU.
ZINC SMELTING FURNACE.
APPLICATION FILED OCT. 22, 1902.
NO MODEL. 4 SHEETS—SHEET 3.

Witnesses:
H. Mallner
Joseph Merritt

Inventor
Jos. P. Cappeau
By William A. Lorenz Att'y.

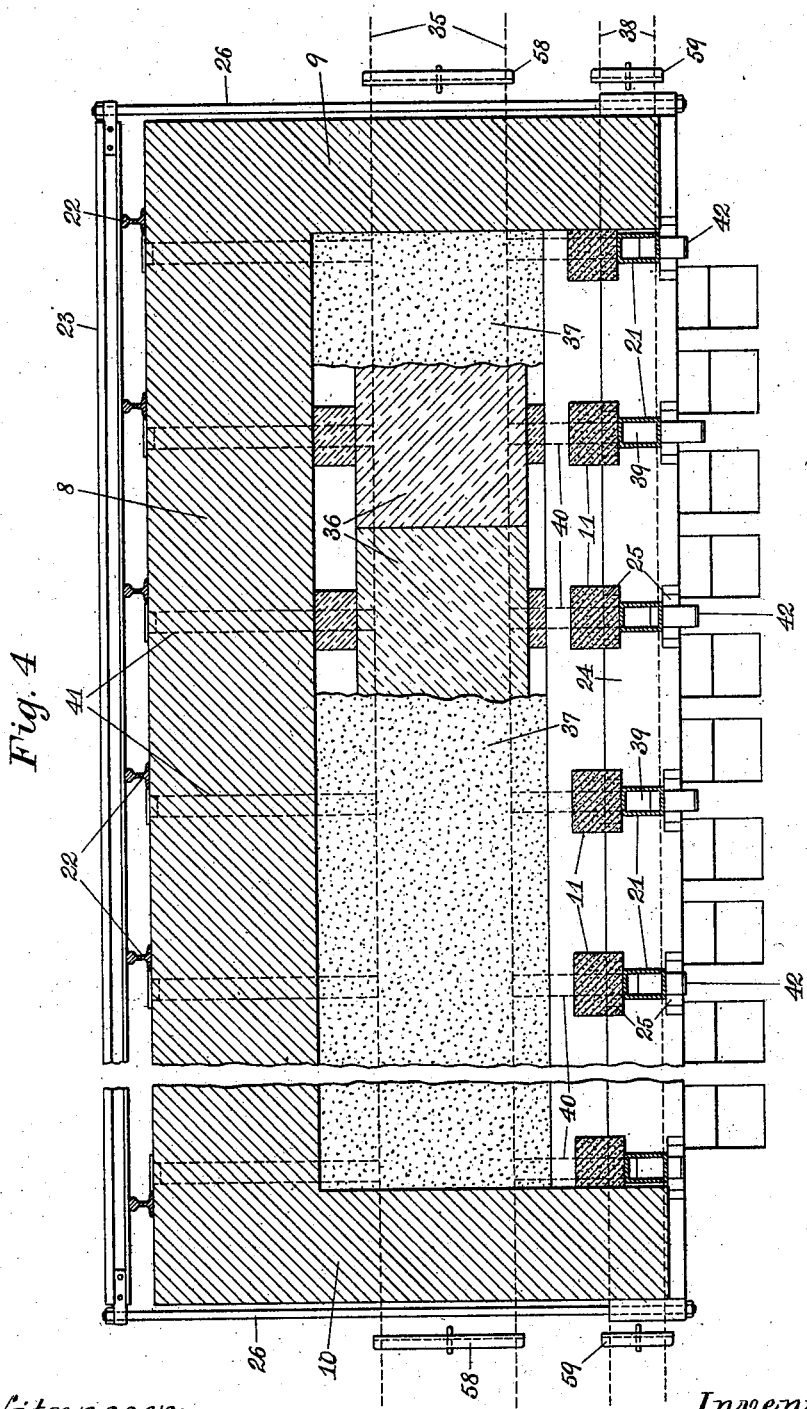

UNITED STATES PATENT OFFICE.

JOSEPH P. CAPPEAU, OF JOPLIN, MISSOURI.

ZINC-SMELTING FURNACE.

SPECIFICATION forming part of Letters Patent No. 720,664, dated February 17, 1903.

Application filed October 22, 1902. Serial No. 128,258. (No model.)

*To all whom it may concern:*

Be it known that I, JOSEPH P. CAPPEAU, a citizen of the United States of America, and a resident of Joplin, in the county of Jasper and State of Missouri, have invented certain new and useful Improvements in Zinc-Smelting Furnaces, of which the following is a specification.

My invention relates to zinc-smelting furnaces; and it consists in an improved arrangement of air-pipes or of hollow buckstays adjacent to the columns of retorts, so as to distribute air and gas in an improved manner to the interior of the furnace and adjacent to the retorts; and it also consists in an improved construction of air-passages by which air is heated and distributed through the buckstays to the furnace by means of a natural draft.

In carrying out my invention I form a main air-passage below the entire length of the furnace and adjacent to the lower ends of the hollow buckstays in front of the furnace. This main passage is made of a large section, and the air passing through it is controlled by means of a damper arranged at the outer end of the passage. This main passage communicates, by means of air-passages, with the lower ends of the hollow buckstays, which are arranged adjacent to each column of retorts. The air passes into the furnace from the hollow buckstays through air-discharge ports communicating with the interior of the furnace, these discharge-ports being adjacent to each retort. A natural draft passes through the air-passages, then through the hollow buckstays and the discharge-ports, and passes into the interior of the furnace to every retort, thereby effecting a thorough subdivision of the air into small jets. The air passing through the air-passages is heated. I introduce gas adjacent to these air-discharge ports at frequent intervals, the gas and air mixing and igniting as they enter the furnace adjacent to the retorts. By subdividing the air into a multiplicity of small jets a better distribution of the heat is effected throughout the furnace, thus obviating the distribution of air and gas in an uneven manner, which operates injuriously upon the retorts themselves.

Figure 1:
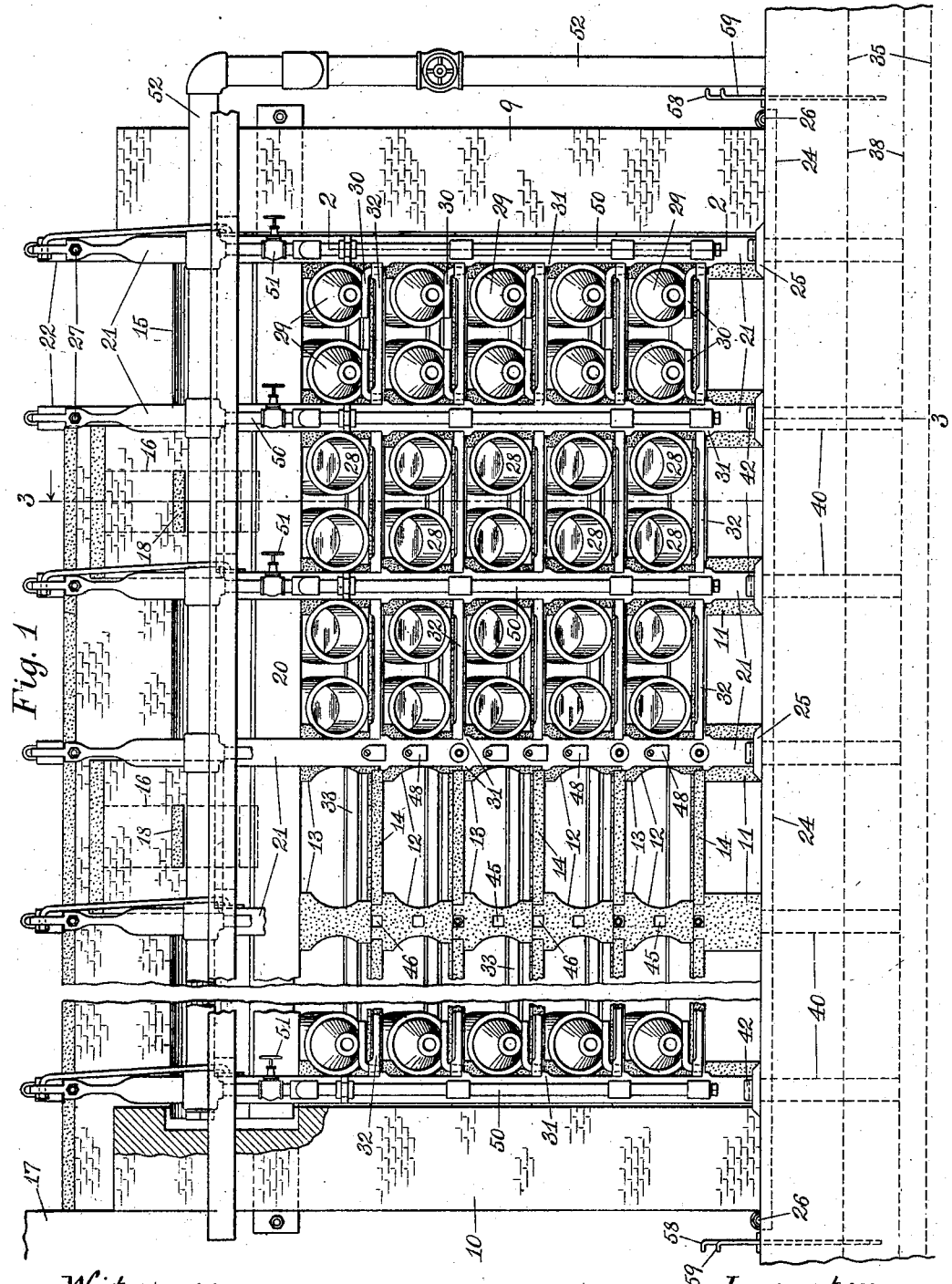
Figure 2:
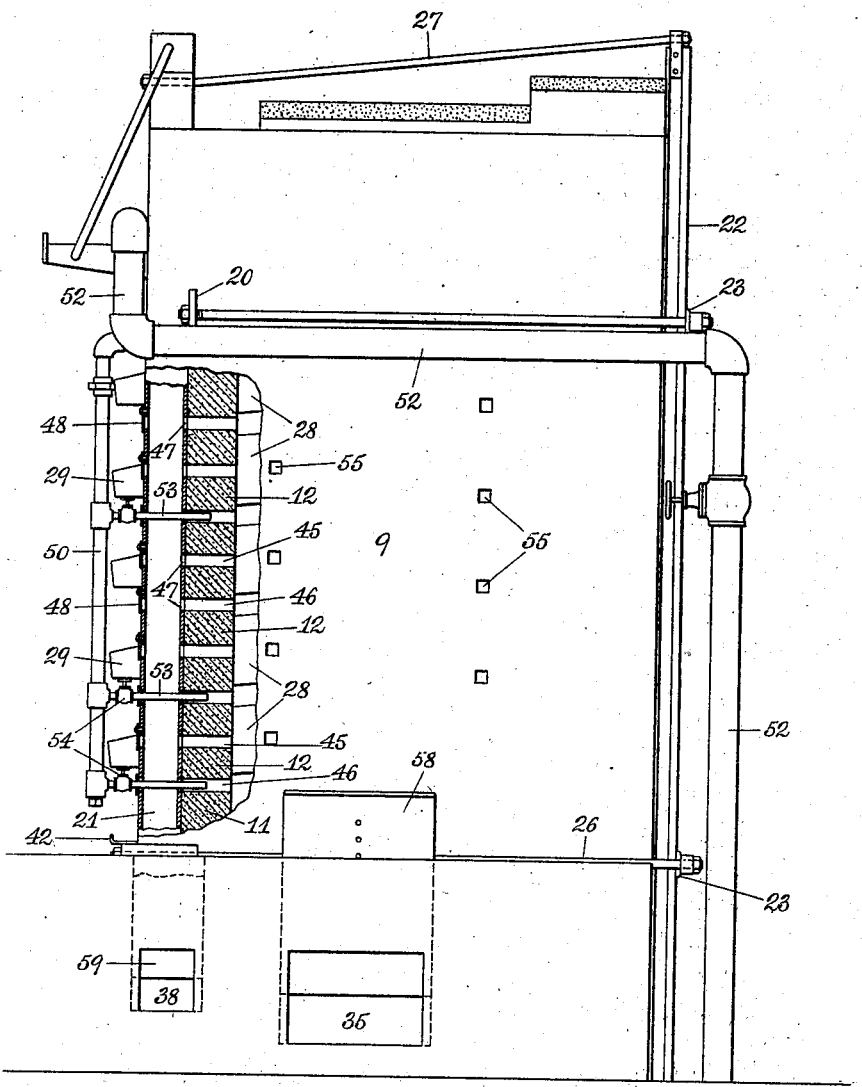
Figure 3:
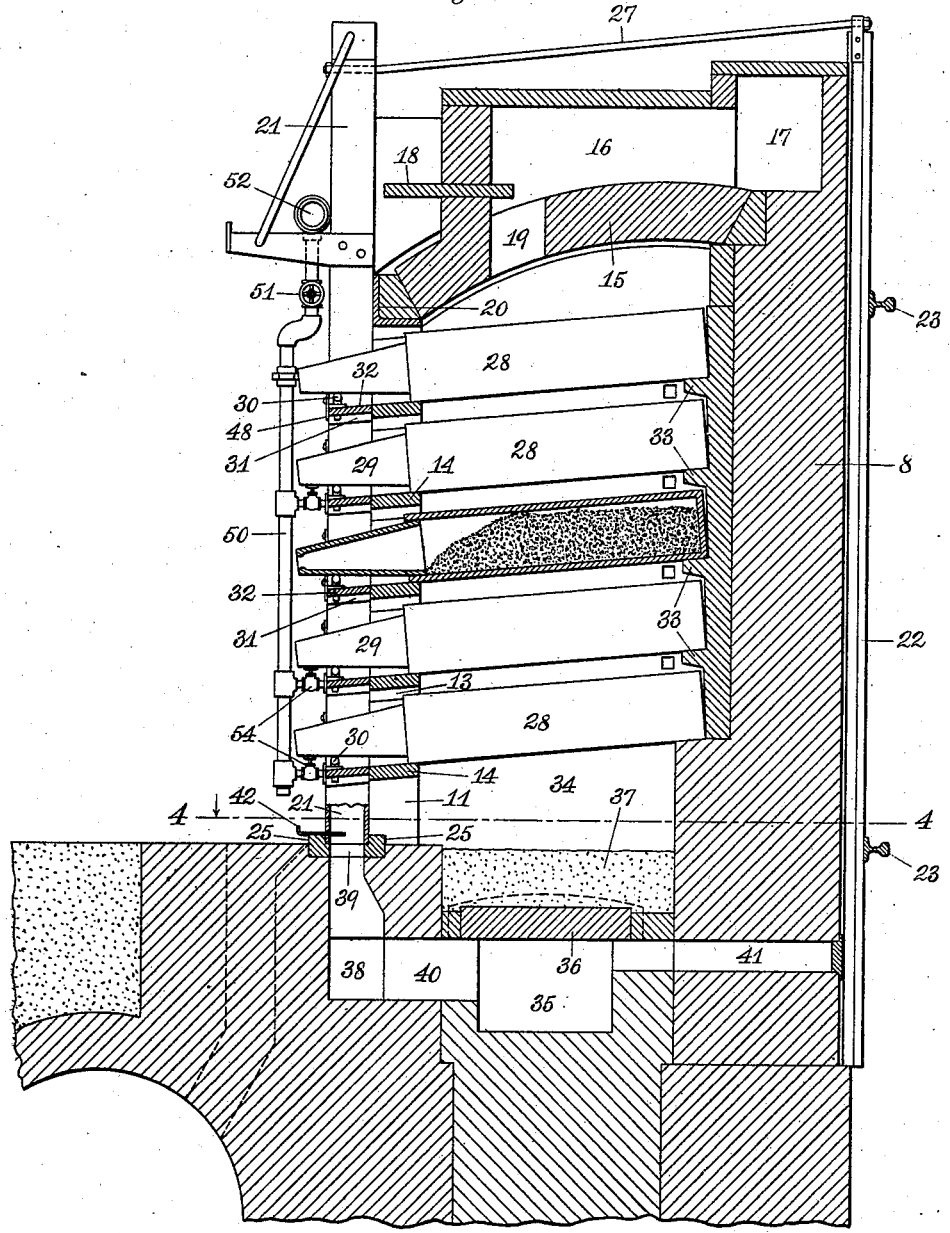

In the drawings, in which similar figures denote similar parts, Figure 1 is a front view of my improved furnace, showing one buckstay moved at the left-hand end thereof and having a portion of the furnace broken out. Fig. 2 is a view of the right-hand end of the furnace shown in Fig. 1, a portion thereof being broken away and shown in cross-section on the line 2 2 of Fig. 1. Fig. 3 is a vertical cross-section on the line 3 3 of Fig. 1. Fig. 4 is a sectional elevation taken on the line 4 4 of Fig. 3, showing a portion of the sand filling in the bottom of the furnace broken away.

In the accompanying drawings the back of my improved furnace is designated by the numeral 8, and the ends are shown at 9 and 10. The front of the furnace consists of a series of pillow-blocks 11 and 12 12 12, placed one above another, forming a column the full height of the furnace. These pillow-blocks are provided with ears 13 13, upon which rest plates 14 14. The pillow-blocks 11 and 12 and the plates 14 are made of tiles in order to resist the heat of the interior of the furnace.

15 represents an arch forming the roof of the furnace, having flues 16 communicating with the chimney 17, the flues 16 having controlling-dampers 18 for modifying the size of the inlet-openings 19, communicating with the interior of the furnace. The arch 15 is supported by the rear wall 8 and the front girder 20, the latter resting upon the upper pillow-blocks 12 and against the series of hollow buckstays 21, placed in front of the column of pillow-blocks 12 and adjacent thereto. The rear of the furnace is held by suitable rails 22 and cross-braces 23. The series of hollow buckstays 21 rest at their lower ends in the brace 24, supported by suitable shoulders 25. This buckstay-brace 24 is tied at its lower end by means of rods 26 to the lower cross-brace 23, and the upper ends of the buckstays 21 are tied to the rails 22 by means of tie-rods 27, the braces and tie-rods operating to hold the walls of the furnace in proper position. The buckstays 21 are placed adjacent to each column of retorts 28. Some of these retorts are shown with condensers 29 in position resting upon supports 30. The buckstays 21 are provided with ears 31, upon which rest metallic plates 32 in front of the tile plates 14. These plates 14 support the buckstays from moving sidewise. The retorts 28 rest at their front ends upon the tile plates 14 and at their rear ends upon projections 33, attached to the rear wall 8 of the furnace.

Placed lengthwise below the interior of the furnace 34 there is shown a main air-passage 35, covered with tiles 36 and sand 37. There is also shown a longitudinal supplementary passage 38, arranged adjacent to and communicating with the lower ends of the buckstays 21 by means of openings 39 in the buckstay-brace 24. The passages 35 and 38 are connected by means of cross-passages 40, opposite each buckstay, and openings 41 are provided in the rear wall 8 for cleaning out the passages 40 from the rear of the furnace. The main passage 35 is provided at its ends with dampers 58, and the passage 38 is provided with dampers 59. These dampers may be used at one or both ends of these passages, and they may be opened to a greater or less extent, as desired, in order to control the amount of air admitted to these passages. If desired, one longitudinal passage may be employed in the place of two, provided it may be made of sufficient area. This passage should be located, preferably, below the bottoms of the buckstays 21, and the outer ends of the passage should be free to take in the desired amount of air without any obstruction. The tile cover 36 and the sand 37 should be of sufficient thickness to prevent the tile from being cracked by the intense heat in the furnace, but not so thick as to prevent the air in the air-passages beneath the furnace from being heated.

The lower ends of the buckstays 21 are provided with dampers 42, with which to modify the amount of air admitted to each buckstay. The upper ends of the hollow buckstays are closed.

The pillow-blocks 12 are provided with openings 45 and 46 adjacent to each retort. These holes pass clear through the pillow-blocks 12. The buckstays 21 are placed immediately in front of the openings 45 and 46 and are provided with corresponding openings 47, forming a communication between the interior of the buckstay and the interior of the furnace. Opposite to these openings 47 and upon the outer sides of the buckstays there are placed corresponding openings, closed by means of doors 48, which may be swung open to admit air or for other purposes. In front of or adjacent to each buckstay there are placed vertical gas-pipes 50, having controlling-valves 51 communicating with a main pipe 52. Smaller branch pipes 53, controlled by valves 54, communicate with the gas-pipes 50 through the buckstays 21 and partly through a number of the openings 46. By these means gas is admitted through the desired number of openings 45 and 46 and mixing there with the air it is ignited as it passes into the interior of the furnace 34. The end walls of the furnace are provided with peep-holes 55 in order to examine the interior of the furnace.

The operation of this furnace is as follows: The retorts 28 having been filled with suitable material and the condensers 29 having been put in position, as shown in Fig. 3, the fronts of the retorts 28 and the openings between these fronts and between the pillow-blocks 12 and the plates 14 having been filled with clay, so as to entirely close up the front of the furnace, gas is then admitted through the main pipe 52 and through the supplementary pipes 50 and cross-pipes 53, the supply at each of the cross-pipes 53 being controlled by the valves 54. The gas is ignited as it passes into the interior of the furnace, drawing air through the pillow-block openings and the buckstays and from the main air-passages 38 and 35, the amount of air being controlled by means of the dampers 42, 58, and 59. As the heat rises in the furnace the retorts are gradually heated until they arrive at the proper temperature, after which the distillation of the metal takes place in the usual manner. If preferred, the furnace may be heated before the introduction of the retorts.

The heat required in this furnace is a very intense one, and it is of the utmost importance that this heat shall be distributed in an even manner, so as not to unduly heat some retorts and leave other retorts without a sufficient amount of heat, and I find that in actual practice the subdivision of the amount of air required in this style of furnace into a multiplicity of small jets placed adjacent to each retort operates beneficially upon them. I am also able to do away with the forced draft heretofore employed in this class of furnaces, effecting a material saving of power and in construction. By making a large air-passage below the furnace communicating with the hollow buckstays and by heating the air therein I find the use of a natural draft to be a very important consideration.

I claim as my invention—

1. The combination with a zinc-smelting furnace, of a series of air-pipes arranged at intervals at the front of the furnace, a main air-passage adjacent to the lower ends of the air-pipes, communicating with them, and open at its end to the outer air, and discharge-ports in the air-pipes communicating with the interior of the furnace adjacent to the retorts, whereby air is conveyed to the furnace by a natural draft and distributed at numerous intervals to the furnace adjacent to the retorts.

2. The combination with a zinc-smelting furnace, of a series of air-pipes arranged at intervals at the front of the furnace, an air-passage adjacent to the lower ends of the air-pipes communicating with them, and open at its end to the outer air, means for heating the air-passage, and discharge-ports in the air-pipes communicating with the interior of the furnace adjacent to the retorts, whereby heated air is conveyed to the furnace by a natural draft and distributed at numerous intervals to the furnace adjacent to the retorts.

3. The combination with a zinc-smelting furnace, of a series of air-pipes arranged at intervals at the front of the furnace, a main air-passage adjacent to the lower ends of the air-pipes, communicating with them, and open at its end to the outer air, discharge-ports in the air-pipes communicating with the interior of the furnace adjacent to the retorts, and a damper arranged in the said air-passage for controlling the supply of air.

4. The combination with a zinc-smelting furnace, of a series of air-pipes arranged at intervals at the front of the furnace, a main air-passage adjacent to the lower ends of the air-pipes, communicating with them, and open at its ends to the outer air, discharge-ports in the air-pipes communicating with the interior of the furnace adjacent to the retorts, gas-pipes arranged adjacent to the discharge-ports, and means for conveying gas to said pipes, whereby air and gas are conveyed and distributed at numerous intervals to the furnace adjacent to the retorts.

5. The combination with a zinc-smelting furnace, of a series of air-pipes arranged at intervals at the front of the furnace, cross-passages adjacent and connected to the lower ends of the air-pipes, a main air-passage connected to the cross-passages, and open at its end to the outer air, and discharge-ports in the air-pipes communicating with the interior of the furnace adjacent to the retorts, whereby air is conveyed to the furnace by a natural draft and distributed at numerous intervals to the furnace adjacent to the retorts.

In testimony whereof I have signed my name to this specification, in the presence of two subscribing witnesses, this 26th day of September, 1902.

JOSEPH P. CAPPEAU.

Witnesses:
SAML. DAVIES,
HAROLD C. STUART.